Patented Aug. 23, 1927.

1,640,193

UNITED STATES PATENT OFFICE.

CHARLES HOFFMAN, OF TUCKAHOE, NEW YORK, ASSIGNOR TO WARD BAKING COMPANY, OF NEW YORK, N. Y., A CORPORATION OF NEW YORK.

PROCESS FOR MAKING FOOD PRODUCTS.

No Drawing. Application filed August 20, 1924. Serial No. 733,110.

The present invention relates primarily to a process for the manufacture of a food product having a notably high vitamine content. It has to do particularly with an improvement and further development over the process disclosed in the patent of Charles Hoffman, Harris Davett Grigsby and Nathan Minton Cregor, No. 1,541,263, granted June 9, 1925, to the assignee of the present application.

In its preferred form, the product consists of a dry powder of yellowish brown color having a high content of soluble sugars and characterized by a sweet malty taste. The material also has a high content of protein and mineral salts and additionally serves as a carrier for a large amount of vitamines, notably the water soluble B vitamine. A particular merit of the manufacture is that the product is produced from cereal germs, such as for instance, wheat germs, corn or maize germs and rice germs. Cereal germs constitute a by-product of milling processes and are readily obtainable at low cost.

In carrying out the process, the cereal germs are first freed from their oily content. Without extraction of the oil from the cereal germs, it is impossible to produce a product having a nutritive value as great as that possessed by the present product. The oil free germs are then cooked in order to gelatinize the starch contained in them. It is desirable and necessary that the raw materials be thoroughly cooked in order that the mass may be in proper condition to respond to the treatment administered during the subsequent steps of the process. The mass containing the gelatinized starch is then subjected to the action of malt diastase for the purpose of saccharifying the starch and converting it into soluble sugars. The resulting liquor is filtered off and is subsequently concentrated to the desired consistency. The process just outlined corresponds to that described in the above mentioned copending application.

In the carrying out of the process, however, much difficulty was encountered in securing a complete digestion of the cooked, oil-free cereal germs so that the resulting product was free from starches. The present invention contemplates the elimination of this difficulty, and it is a principal object of this invention to provide a process of the above general nature for the manufacture of a palatable food product of high nutritive value such that the digestion of the starches by the malt takes place rapidly and completely and without deleterious effect upon the flavor or other characteristics of the ultimate product.

The digestion of the oil free cereal germs with malt proceeds slowly and, in fact, it was found practically impossible to secure such a complete digestion of the mass as would render the product starch free after the malting operation. Periods of digestion ranging up to as much as two hours were insufficient to accomplish such a thorough conversion of the starch that the malted mixture would appear to be starch free as indicated by the starch iodine test. Similarly the use of larger quantities of malt, differences in the time and temperatures of cooking, differences in temperatures of mashing and the like, were of but little avail in securing a better and more complete conversion of the starches during the malting operation.

The present invention contemplates the rapid and complete digestion of the cooked raw materials by conducting the malting operation under a properly controlled acid reaction. When the malt digestion of the cooked product was made with water of neutral or but slightly alkaline reaction, the filtered malted liquor and the ultimate product exhibited an acidity expressed as pH of from 5.9 to 6.0. The pH value of the solution was measured by the standard potentiometer method based on the electrical conductivity of the substance. As the result of experimentation, I found that as the acidity was increased, within certain limits, the action of the malt upon starches of the batch was favored and complete digestion of the contained starches was attained in a reduced time. I also found that when the acidity of the batch exceeded certain limits, the ultimate product was characterized by a decidedly disagreeable bitter taste. The present invention therefore contemplates the addition to the cooked oil free cereal germs of acid in such amount as to permit rapid digestion of the starches by the malt and at the same time to preserve a palatable flavor in the ultimate product.

I have found that for the production of the best product, the amount of acid added should be sufficient to give to the ultimate product a pH value of from 5.4 to 5.7. Larger amounts of acid can be added with beneficial results in the malt digestion step, but the use of such amounts of acid ordinarily introduces a bitter taste in the ultimate product. Acid may be added in such quantity that the pH value of the ultimate product will be as low as 5.1 without rendering the product definitely unpalatable, but I prefer to maintain the acidity of the ultimate product at a pH value of between 5.4 and 5.7. A high concentration of acid apparently has the effect of extracting and communicating to the ultimate product certain bitter principles contained in the raw materials or results in a breaking down of some of the nitrogenous constituents of the raw material to form unpalatable compounds. The fact is that with too high an acid concentration, the ultimate product has a disagreeable bitter taste.

Neutralization of excess amounts of acid used in the process, while serving to bring the pH value of the ultimate product within the desired limits, nevertheless do not serve to render the product palatable. The taste of the ultimate product is substantially the same as that observed when similar excess quantities of acids were used and were present in the ultimate product.

The effect of the presence of acid during the malt digestion of the cooked oil-free cereal germs may be well illustrated experimentally. For instance four batches, consisting each of 200 parts of oil-free wheat germ, 30 parts malt, and 1500 parts water were subjected to processes identical with the exception that for batch 1, no acid was added during the malting step; for batch 2, .36 parts of acid were added during the malting operation; for batch 3, .72 parts of acid were added, and for batch 4, 1.08 parts of acid were added. The acid used was concentrated sulfuric acid. For batches 3 and 4, the excess acidity was neutralized with calcium carbonate. The ultimate product showed for batch 1 a pH value of 5.9, for batch 2 a pH value of 5.6, for batch 3 a pH value of 5.6 and for batch 4 a pH value of 5.4. Batch 1 was subjected to a malt digestion for a period of two hours and even after this extended period of digestion, small amounts of starch still remained unconverted by the malt diastase. Batch 4 was starch free after only 15 minutes of malt digestion and batches 2 and 3 were starch free after a digestion of slightly more than 15 minutes. The resulting products showed considerable differences in flavor. Batches 1 and 2 were of substantially identical flavor and were entirely palatable and pleasing to the taste. Batches 3 and 4 both exhibited a sharp and slightly bitter taste. My experimentation demonstrated that the best product is obtained when the amount of acid added serves to give the ultimate product a pH value of between 5.4 and 5.7, no basic neutralizing agent being added. With such a quantity of acid, the length of time required for complete digestion of the starches by the malt is short and requires but from 15 to 20 minutes.

In carrying out my improved process, cereal germs are first freed from their vegetable oil by a suitable extracting agent, such as benzol or carbon tetrachloride. Either of these extraction agents is available commercially and may be used economically because of low cost, efficiency in extracting the oily matter and ready regeneration. The oil free germs are then cooked preferably under a pressure of about 15 pounds per square inch gauge for from 15 to 30 minutes. I have found that better results are obtained by cooking the raw materials at relatively high pressure and temperature for a relatively short length of time rather than conducting the cooking operation at atmospheric pressure and temperature for a greater length of time. The cooked mash is then cooled to 133° F. at which point the requisite amount of acid is added. In the case of sulfuric acid for instance, an amount of acid in the neighborhood of .36 parts of concentrated sulfuric acid to 200 parts of oil free germ is suitable. After the addition of acid the material is malted preferably by the addition of a malt infusion prepared by digesting 20 parts of malt and 250 parts of water at 82° F. for 15 minutes, then at 100° F. for 15 minutes and then at 133° F. until needed for addition to the batch. The malted mash is then digested for a proper length of time, say 15 to 20 minutes, until the starch iodine test shows the material to be free from starch. The liquor is then filtered off and concentrated as desired. The product is preferably evaporated to dryness so that the ultimate product is a solid in the form of a powder.

The process is preferably supplemented by a second malt digestion step, the second malting operation taking place either just before filtration of the mash, immediately after filtration of the mash or after concentration of the liquor to syrupy consistency. The process employing the double malt digestion is fully disclosed in the copending application of Nathan Minton Cregor for "process for making food product" filed concurrently herewith. No claim is made in this application to the process employing the double malting feature except when such process includes the control of the acidity during the malt digestion step as described herein. The present invention does contemplate a process employing the double malting step wherein the acidity of the mash during the malting operation is controlled after the fashion described in this application.

The character of the water used in the cooking and malt digestion operations has an effect upon the quantity of acid which must be added. With water which for instance is strongly alkaline, it is necessary to add an amount of acid greater than that above specified for the reason that an excess amount of acid is required in order that the alkalinity of the water may be neutralized and at the same time a sufficient acid concentration obtained to permit rapid digestion of the starches by the malt.

The present invention therefore contemplates a process which includes addition to the material under treatment of an amount of acid such that the malt digestion of the raw material will require a substantially shorter time and such that no disadvantageous effect in the ultimate product will be produced.

I claim:

1. The method of producing from cereal germs a food product rich in water soluble B vitamine which comprises extracting the oil from the said germs, cooking the raw material to gelatinize the starch contained therein, acidifying the said cooked material and malting said material to effect saccharification thereof.

2. The method of producing from cereal germs a food product rich in water soluble B vitamine, which comprises extracting oil from the said germs, cooking the raw material to gelatinize the starch contained therein and malting said material in the presence of acid in such amount as to permit rapid digestion of the starch and at the same time preserve a palatable flavor in the ultimate product.

3. The method of producing from cereal germs a food product rich in water soluble B vitamine, which comprises malting the raw material in the presence of acid in such amount as to permit rapid digestion of the starch and at the same time preserve a palatable flavor in the ultimate product.

4. The method of producing from cereal germs a food product rich in water soluble B vitamine which comprises malting said material in the presence of acid sufficient in amount to permit complete digestion of the starch in from 15 to 30 minutes and at the same time to avoid extraction of bitter principles from the raw material with the production of a consequent disagreeable flavor in the ultimate product.

5. The method of producing from cereal germs a food product rich in water soluble B vitamine which comprises malting cereal germs under an acid reaction, such that a rapid digestion of the contained starches is produced and a palatable flavor in the ultimate product is preserved.

6. The method of producing from cereal germs a food product rich in water soluble B vitamine, which comprises malting oil free cereal germs under an acid reaction such that the ultimate product is of acidity represented by a pH value of from 5.4 to 5.7.

7. The method of producing from cereal germs a food product rich in water soluble B vitamine, which comprises extracting the oil from said germs, cooking the raw material to gelatinize the starch contained therein, and malting said material in the presence of an amount of acid such that the ultimate product exhibits an acidity represented by a pH value of from 5.4 to 5.7.

8. The method of producing from cereal germs a food product rich in water soluble B vitamine, which comprises extracting the oil from said germs, cooking the material to gelatinize the starch contained therein, acidifying the said cooked material, malting said acidified material and filtering and concentrating to dryness the resulting liquor, the amount of acid added to said material being such as to produce in the ultimate product an acidity represented by a pH value of from 5.4 to 5.7.

9. The method of producing from cereal germs a food product rich in water soluble B vitamine which comprises extracting the oil from said germs, cooking the raw material to gelatinize the starch contained therein, acidifying the said cooked material, malting the said acidified material and filtering and concentrating to dryness the resulting liquor, the amount of acid added to said material being such as to produce a rapid digestion of the starches by the malt and at the same time preserve a palatable flavor in the ultimate product.

10. The method of producing from cereal germs a food product rich in water soluble B vitamine which comprises extracting the oil from the said germs, cooking the raw material to gelatinize the starch contained therein, acidifying the said cooked material and malting the said acidified material to effect saccharification thereof, the amount of acid added being sufficient to neutralize the alkalinity of the water used in the process and to further acidify the material under treatment to thereby permit rapid digestion of the starches by the malt and at the same time to preserve a palatable flavor in the ultimate product.

11. The method of producing from cereal germs a food product rich in water soluble B vitamine, which comprises extracting the oil from the said cereal germs, cooking said oil free germs until the starch present is gelatinized, malting the material in the presence of acid in such amount as to permit rapid digestion of the starch and at the same time preserve a palatable flavor in the ultimate product, subsequently malting the material a second time and concentrating the resulting malted liquor.

In testimony whereof I affix my signature.

CHARLES HOFFMAN.